（12） United States Patent
Kim

(10) Patent No.: US 7,597,358 B2
(45) Date of Patent: Oct. 6, 2009

(54) BELT BUSHING FOR SAFETY BELT AND ASSEMBLING METHOD THEREOF

(75) Inventor: Sung Kook Kim, Suwon-si (KR)

(73) Assignee: Hankook Capability Co., Ltd., Pyongtaek-Si Kyungki-Do (KR)

( * ) Notice: Subject to any disclaimer, the term of this patent is extended or adjusted under 35 U.S.C. 154(b) by 0 days.

(21) Appl. No.: 12/119,835

(22) Filed: May 13, 2008

(65) Prior Publication Data

US 2008/0296882 A1 Dec. 4, 2008

(30) Foreign Application Priority Data

Jun. 1, 2007 (KR) .................... 10-2007-0053934

(51) Int. Cl.
*B60R 22/00* (2006.01)
(52) U.S. Cl. .................... 280/801.1; 297/482; 292/221; 292/226
(58) Field of Classification Search .............. 280/801.1; 297/473, 480, 482, 483, 479; 403/221, 226, 403/228, 293, 294
See application file for complete search history.

(56) References Cited

U.S. PATENT DOCUMENTS

| 3,959,855 | A | * | 6/1976 | Fisher | ............. 24/163 FC |
| 5,513,880 | A | * | 5/1996 | Ohira et al. | ............. 280/808 |
| 6,502,861 | B2 | * | 1/2003 | Specht | ............. 280/808 |
| 6,526,630 | B2 | * | 3/2003 | Suzuki et al. | ............. 24/265 BC |
| 6,715,793 | B2 | * | 4/2004 | Okubo | ............. 280/808 |

\* cited by examiner

*Primary Examiner*—Toan C To
(74) *Attorney, Agent, or Firm*—IPLA P.A.; James E. Bame

(57) ABSTRACT

Provided is a belt bushing for safety belt, combined to a through-hole of a belt combiner and winding the safety belt. The belt bushing gets in contact and combined to all four-side inner circumference surfaces of the through-hole of the belt combiner.

4 Claims, 4 Drawing Sheets

BELT BUSHING FOR SAFETY BELT AND ASSEMBLING METHOD THEREOF

CROSS REFERENCE

This application claims foreign priority under Paris Convention and 35 U.S.C. § 119 to Korean Patent Application No. 10-2007-0053934, filed Jun. 1, 2007 with the Korean Intellectual Property Office.

BACKGROUND OF THE INVENTION

1. Field of the Invention

The present invention relates to a belt bushing for safety belt and an assembling method thereof, and more particularly, to a belt bushing for safety belt added to a belt combiner combining a safety belt and increasing a tensile strength of the safety belt, preventing belt cutting, and reducing a manufacturing cost of the belt combiner, and an assembling method thereof.

2. Description of the Related Art

In general, a safety belt is to firmly support a human body to prevent injury as well as keep life. Particularly, of much significance is a combination structure of such as a variety of belt combiners combining a belt, that is, a belt combiner for safety device, a belt combiner firmly fixed to a car frame, and a belt combiner for buckle.

This will be described for example. A safety belt 20 for vehicle is wound at both sides in through-holes 11 of belt combiners 10, respectively, and is firmly combined and supported by sewing, etc.

However, the belt combiner 10 is formed to have more than a predetermined strength and be thin to the maximum in consideration of material limitation and cost saving and winds and combines the safety belt 20.

Thus, if being repeatedly applied to the combined safety belt 20, a spontaneous tensile pressure is transmitted to an end of the belt combiner 10 of a thin plate shape as it is. The end of the belt combiner 10 serves as an edge of a knife and thus, does damage to the wound safety belt 20 by a little. The safety belt 20 may not guarantee safety because it does not withstand a pressure of about 1,600 kgf/cm$^2$ or more and thus is cut.

Therefore, in order to fix the defects, the belt combiner 10 should be thickened to thereby increase a curvature radius for winding the safety belt 20 and increase a tensile pressure. However, the belt combiner 10 cannot be recklessly thickened because of a thickness limitation of material as above.

In recent years, a separate belt bushing 30 shown in FIGS. 1 to 3 is manufactured and fitted into the through-hole 11 of the belt combiner 10 to wind the safety belt 20. By doing so, a curvature radius of the wound safety belt 20 increases, a tensile pressure applied to the safety belt 20 is decentralized, and a concern about a damage of the safety belt 20 is reduced.

The belt bushing 30 includes a reinforcement 31, reinforcement supports 32, and a combination groove 33. The reinforcement 31 is formed in a straight-line shape and get in contact with a frame of the through-hole 11 of the belt combiner 10 at the side of which the safety belt 20 is wound. The reinforcement supports 32 are bent outward at upper and lower ends of the reinforcement 31 and form an approximately "⊂"shape with the reinforcement 31. The combination groove 33 is provided between the reinforcement 31 and the reinforcement support 32.

The belt bushing 30 and the belt combiner 10 each are manufactured separately and are conveyed for each assembly process. The frame of the through-hole 11 of the belt combiner 10 is inserted into the combination groove 33 of the belt bushing 30 to combine the safety belt 20. By doing so, the reinforcement 31 gets in contact with an inner surface of the through-hole 11, and the reinforcement supports 32 get in contact with one-side upper and lower surfaces of the belt combiner 10.

By winding the safety belt 20 at the side of the reinforcement 31 of the belt bushing 30, the curvature radius of the safety belt 20 is increased, the tensile pressure applied to the safety belt 20 is decentralized by the belt bushing 30, and the concern about safety belt 20 cutting caused by the belt combiner 10 is reduced.

However, the belt bushing 30 and the belt combiner 10 each are manufactured, processed in painting and coating processes, and kept in safe in a separate way as well as they each are conveyed for assembly process in a separate way to fit the belt bushing 30 into the through-hole 11 of the belt combiner 10. Therefore, many manufacturing processes and long time are required and a unit cost increases.

Even in assembly, it happens that the belt bushing 30 is released from the belt combiner 10 when the safety belt 20 is wound in the belt bushing 30 after the small-size belt bushing 30 is fitted into the through-hole of the belt combiner 10. This deteriorates workability, increases a time for work by an unskilled worker, and causes a difficulty in assembling the belt bushing 30 by a non-manual work.

Even after completion of the assembly of the belt bushing 30, spacing is generated and collision and noise are caused between the belt bushing 30 and the through-hole 11 of the belt combiner 10 because of a motion of the wound safety belt 20.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to decentralize a tensile strength applied to a safety belt, thereby preventing cutting of the safety belt.

Another aspect of exemplary embodiments of the present invention is to simultaneously perform part of processes of manufacturing a belt combiner and a belt bushing, thereby reducing a manufacturing cost as well as enabling assembly between the belt combiner and the belt bushing by automation process.

According to one aspect of exemplary embodiments of the present invention, there is provided a belt bushing for safety belt, combined to a through-hole of a belt combiner and winding the safety belt. The belt bushing gets in contact and combined to all four-side inner circumference surfaces of the through-hole of the belt combiner.

The belt bushing may have a " ⊂ " shaped section.

The belt bushing may include a support wall and top and bottom reinforcements. The support wall is provided at four sides, has a belt insertion hole inside, and gets in contact and is combined to the inner circumference surfaces of the through-hole of the belt combiner. The top and bottom reinforcements are outward bent and are integrally installed in succession at upper and lower sides of the support wall. The support wall gets in contact with the inner circumference surfaces of the through-hole of the belt combiner. The top and bottom reinforcements get firmly in contact and are combined to upper and lower surfaces of the belt combiner.

According to another aspect of exemplary embodiments of the present invention, there is provided an assembly method of a belt bushing for safety belt. The method includes providing the belt bushing by forming a support wall at four sides such that it has a belt insertion hole inside, outward bending the support wall at upper side, and forming a top reinforcement; inserting and positioning the belt bushing in a through-hole of the belt combiner such that the support wall gets in contact with an inner circumference surface of the through-hole and the top reinforcement is adhered to an upper surface of the belt combiner; and instantaneously pressing the inserted belt bushing at upper and lower sides by a press, outward bending the support wall at lower side, and forming a top reinforcement at the lower side of the support wall such that it gets in contact and combined to the lower surface of the belt combiner.

The belt combiner combined to the belt bushing may be integrally processed by painting and coating processes and may be improved in producibility.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings. In the following description, a detailed description of known functions and configurations incorporated herein has been omitted for conciseness.

Figure 1:
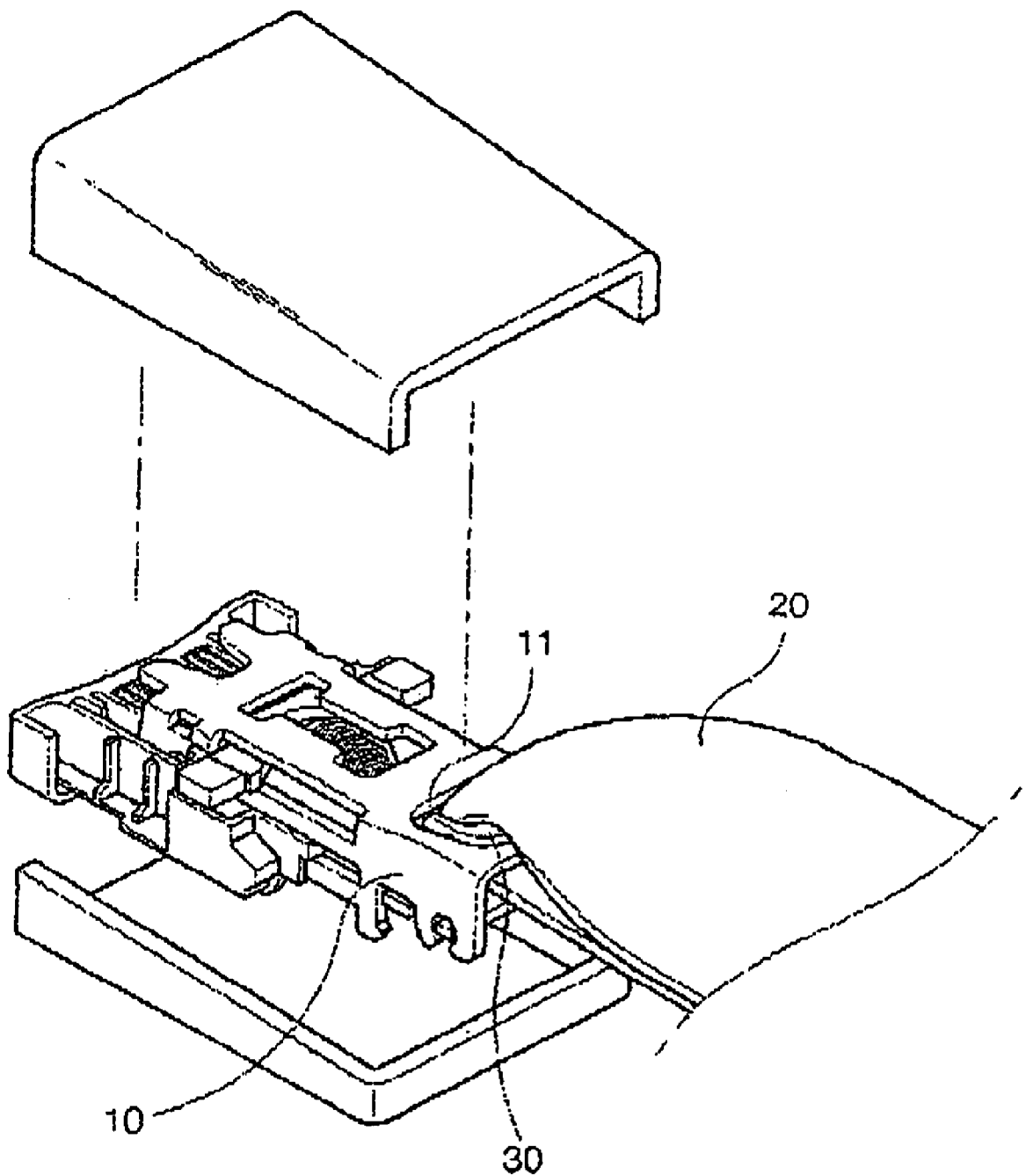
FIG. 1 is a perspective diagram illustrating a partial cutout of a state where a belt bushing and a safety belt are combined to a belt combiner according to the conventional art.
Figure 2:
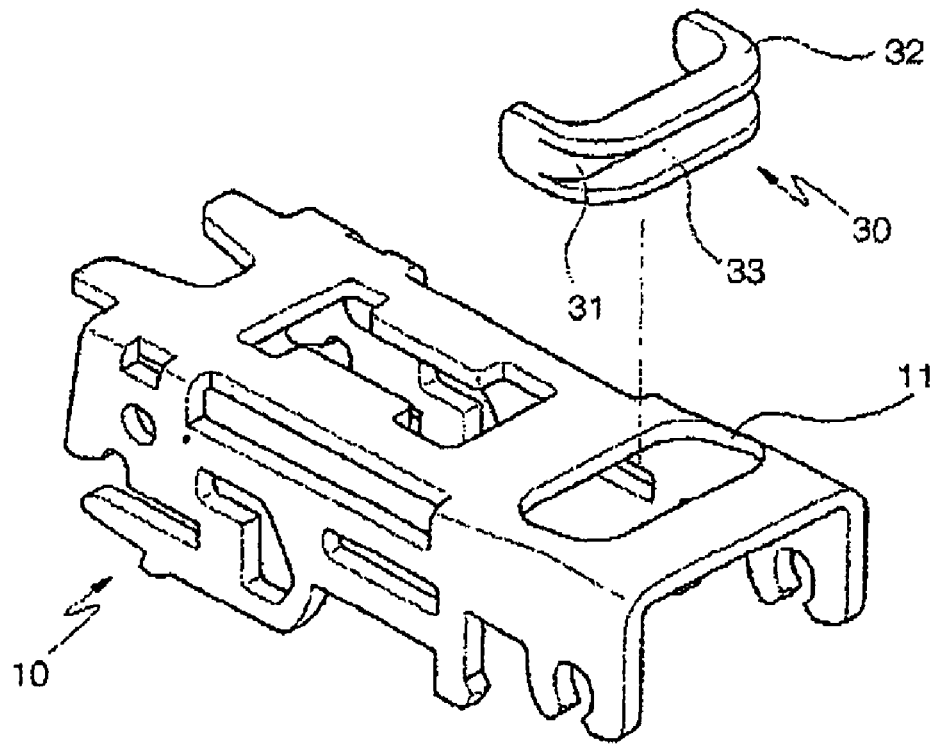
FIG. 2 is a perspective diagram illustrating a state where a belt bushing is separated from a belt combiner according to the conventional art.
Figure 3:
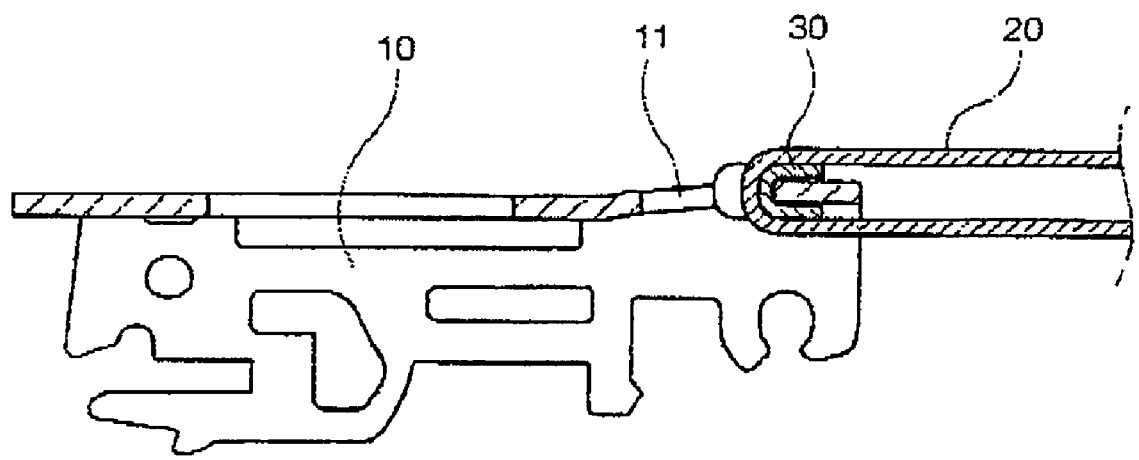
FIG. 3 is a side cross-sectional diagram illustrating a partial cutout of a state where a belt bushing and a safety belt are combined to a belt combiner according to the conventional art.
Figure 4:
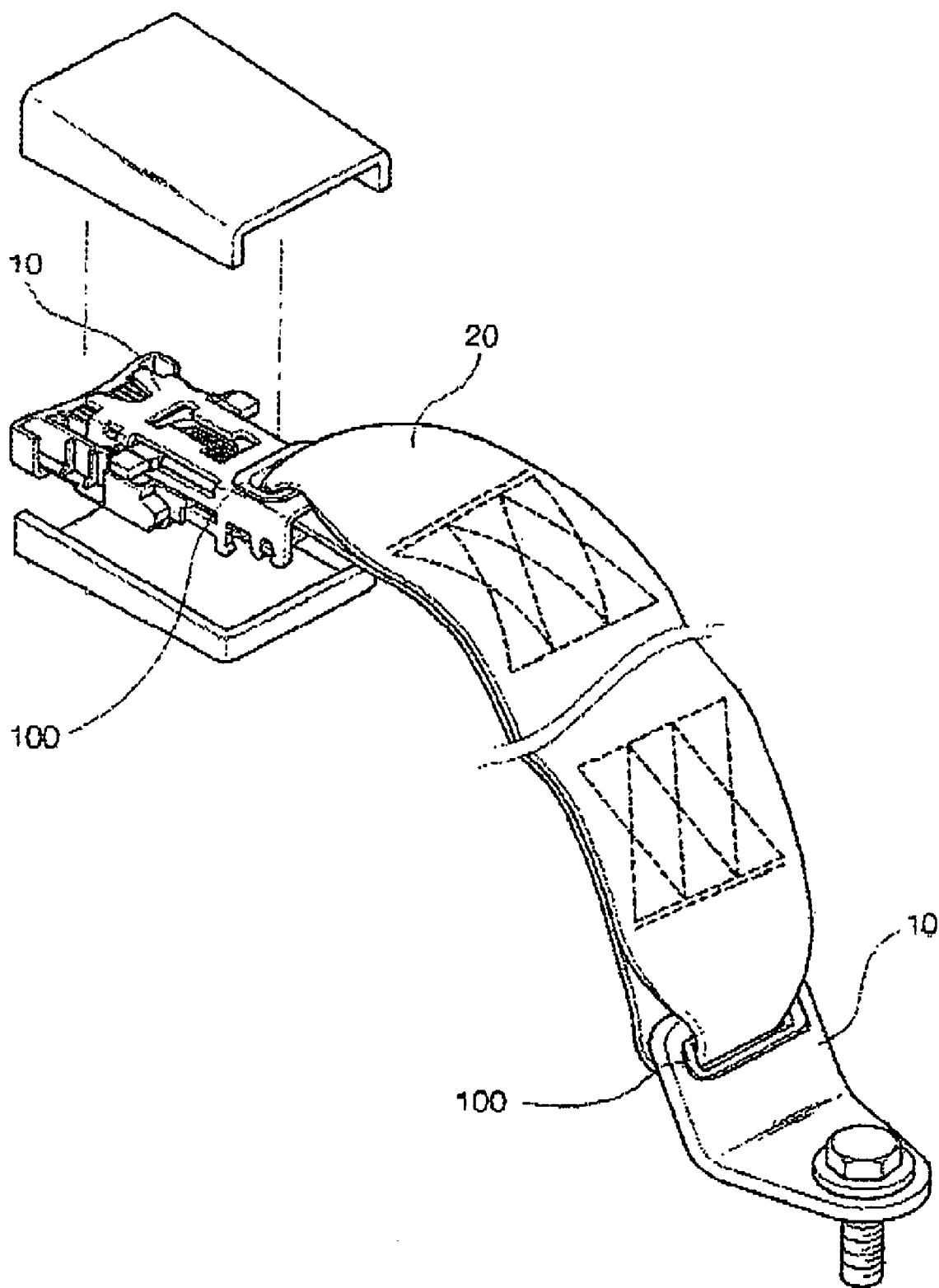
FIG. 4 is a perspective diagram illustrating a partial cutout of a state where a belt bushing and a safety belt are combined to a belt combiner according to the present invention.
Figure 5:
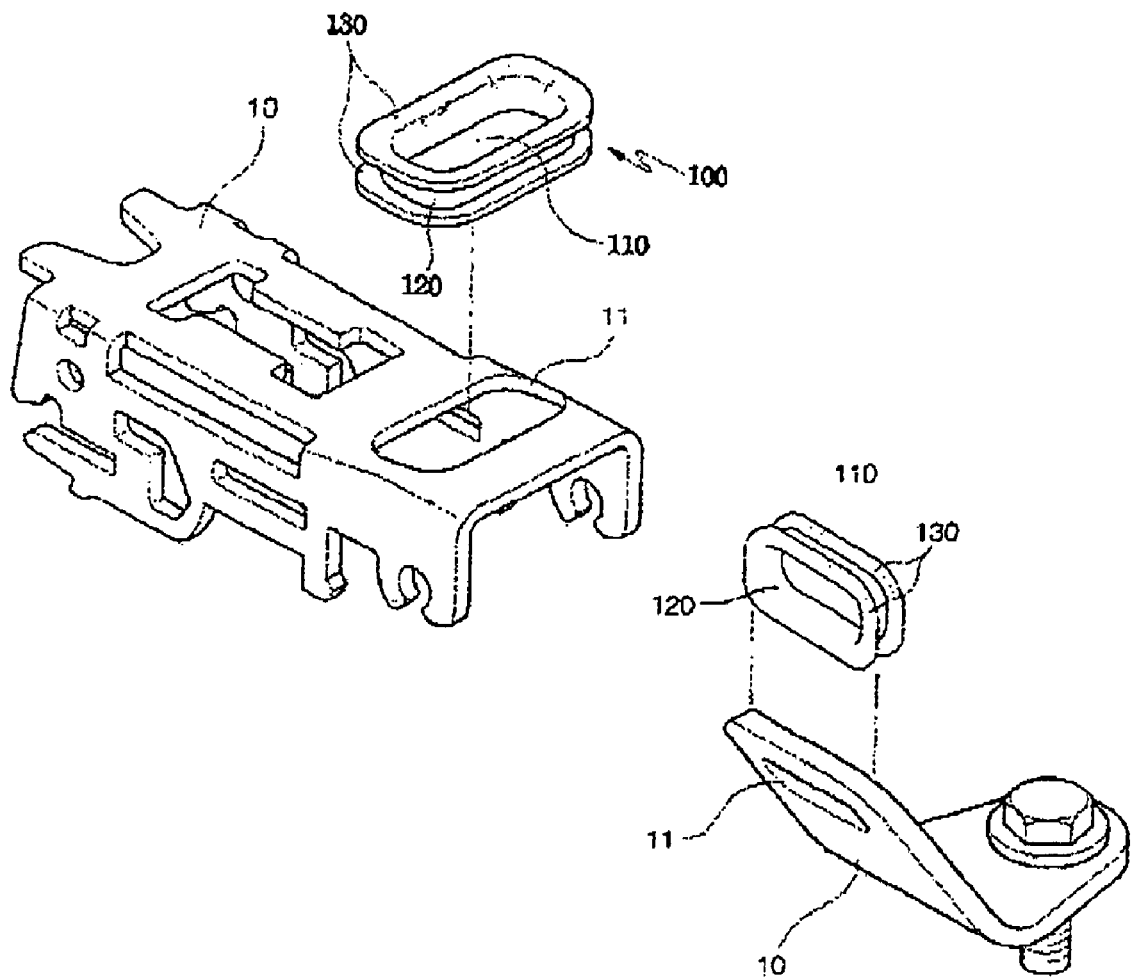
FIG. 5 is a perspective diagram illustrating a state where a belt bushing is separated from a belt combiner according to the present invention.
Figure 6:
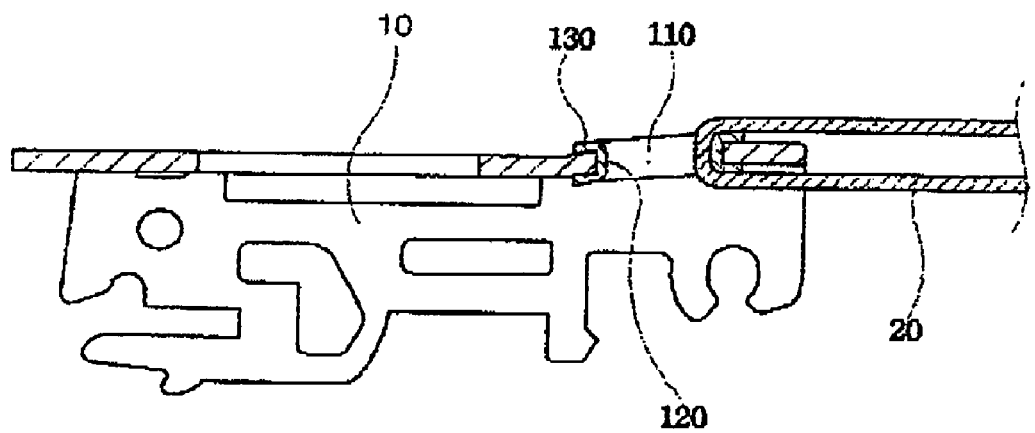
FIG. 6 is a side cross-sectional diagram illustrating a partial cutout of a state where a belt bushing and a safety belt are combined to a belt combiner according to the present invention.

FIG. 4 is a perspective diagram illustrating a partial cutout of a state where a belt bushing and a safety belt are combined to a belt combiner according to the present invention. FIG. 5 is a perspective diagram illustrating a state where the belt bushing is separated from the belt combiner according to the present invention. FIG. 6 is a side cross-sectional diagram illustrating a partial cutout of a state where the belt bushing and the safety belt are combined to the belt combiner according to the present invention.

The present invention provides a belt bushing 100 added to a belt combiner 10 firmly supporting a safety belt 20 of a variety of forms and structures and withstanding even a high tensile strength. The following description will be made for an example of a belt combiner 10 and a safety belt 20 used for a rear seat of a car, but is not intended to limit the scope of the present invention.

The present invention provides a belt bushing combined to a belt combiner 10 similar with the conventional art. The same elements as those of the conventional art are denoted by the same reference numerals in the following description.

In the present invention, the belt bushing 100 is provided in a form in which a support wall 120 having a belt insertion hole 110 inside is in contact with four-side inner circumference surfaces of a through-hole 11 of the belt combiner 10. Top and bottom reinforcements 130 are bent outside of the belt insertion hole 110 by a predetermined width at upper and lower sides of the support wall 120. The support wall 120 and the top and bottom reinforcements 130 have an approximately "⊂" shaped section.

The support wall 120 of the belt bushing 100 is gently curved outside of the belt insertion hole 110. This is desirable for securing stability at the time of winding the safety belt 20.

For this, the belt combiner 10 having the through-hole 11 and the inventive belt bushing 100 are separately manufactured, respectively. However, in the inventive belt bushing 100, only one of upper and lower ends (an upper end in the drawings) of the support wall 120 having the belt insertion hole 110 inside is first manufactured in a form in which the reinforcement 130 is bent outside by a predetermined width.

A support wall 120 portion of the belt bushing 100 is inserted into the through-hole 11 of the belt combiner 10 and gets in contact with an inner surface of the through-hole 11. The inserted belt bushing 100 is positioned such that the reinforcement 130 is caught by an upper surface of the belt combiner 10 outside of the through-hole 11.

The belt bushing 100 combined as above is instantaneously pressed at upper and lower sides by a great pressure using a press (not shown), etc. By doing so, a lower portion of the support wall 120 is bent and widened outside of the through-hole 10. Thus, the bottom reinforcement 130 is integrally installed in succession at a lower side of the support wall 120 and thus, the belt bushing 100 has an approximately "⊂" shaped section.

After the belt bushing 100 and the belt combiner 10 are assembled and combined as above, the resultant is integrally moved and is processed by remaining processes such as a painting process and a coating process at the same time.

By inserting and winding the safety belt 20 in the belt insertion hole 110 provided at the belt bushing 100, the safety belt 20 gets in contact and combined to a curved inner circumference surface of the support wall 120 of the belt bushing 100 with a curvature radius being larger than that of the belt combiner 10. Thus, a tensile strength is improved about 2,200 kgf/cm$^2$ to 2,300 kgf/cm$^2$.

As described above, the present invention has an advantage that a curvature radius of a safety belt wound on a belt combiner is increased and a tensile strength of the belt is improved, thereby reducing a concern about cutting of the belt, stability is guaranteed because there is not a concern about releasing a belt bushing from the belt combiner, and there is not a concern about occurrence of a noise between the belt bushing and the belt combiner in use.

Also, the present invention is very economical in that the belt bushing can be assembled in automation process, thereby improving workability and a work is concurrently performed in painting and coating processes with the belt bushing being integrally combined to the belt combiner, thereby reducing work process and cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A belt bushing for safety belt, combined to a through-hole of a belt combiner and winding the safety belt wherein the belt bushing gets in contact and combined to all four-side inner circumference surfaces of the through-hole of the belt combiner, the belt bushing, comprising:
a support wall provided at four sides, having a belt insertion hole inside, and getting in contact and combined to the inner circumference surfaces of the through-hole of the belt combiner; and
top and bottom reinforcements outward bent and integrally installed in succession at upper and lower sides of the support wall, whereby the support wall gets in contact with the inner circumference surfaces of the through-hole of the belt combiner, and the top and bottom reinforcements get firmly in contact and combined to upper and lower surfaces of the belt combiner.

2. The belt bushing of claim 1, wherein the support wall, and the top and bottom reinforcements each have a "⊂" shaped section.

3. An assembly method of a belt bushing for safety belt, the method comprising:
providing the belt bushing by forming a support wall at four sides such that it has a belt insertion hole inside, outward bending the support wall at upper side, and forming a top reinforcement; inserting and positioning the bell bushing in a through-hole of the belt combiner such that the support wall gets in contact with an inner circumference surface of the through-hole and the top reinforcement is adhered to an upper surface of the belt combiner; and
instantaneously pressing the inserted belt bushing at upper and lower sides by a press, outward bending the support wall at lower side, and forming a top reinforcement at the lower side of the support wall such that it gets in contact and combined to the lower surface of the belt combiner.

4. The method of claim 3, wherein the belt combiner combined to the belt bushing is integrally processed by painting and coating processes and is improved in producibility.

* * * * *